Inventor:
HARTMUT RIESCHEL
By Craig & Antonelli
ATTORNEYS

Inventor:
HARTMUT RIESCHEL
By Craig & Antonelli
ATTORNEYS 3,620,157
APPARATUS FOR BRIQUETTING BULK
MATERIALS ON ROLLER PRESSES
Hartmut Rieschel, Hattingen (Ruhr), Germany, assignor to Maschinenfabrik Koppern & Co. K.G., Hattingen (Ruhr), Germany
Filed May 31, 1968, Ser. No. 733,587
Claims priority, application Germany, July 2, 1967,
P 16 83 904.6
Int. Cl. B30b 3/00
U.S. Cl. 100—145                                    9 Claims

ABSTRACT OF THE DISCLOSURE

Apparatus for briquetting loose material on roller presses by the use of pre-compression in a charging hopper whereby the bulk material which has a grain size predominantly smaller than $40\mu$ is continuously compressed at a predetermined ratio to such an extent that its bulk density reaches approximately 50% of the specific weight.

---

The present invention relates to apparatus for briquetting loose or bulk material on roller presses with pre-consolidation in the charging hopper.

In the course of the briquetting operation on roller presses, the material to be briquetted is drawn in by the rollers rotating in opposite directions and is pressed into briquettes within the forms or molds mounted on the rollers. The volume of the forms or molds is smallest at the moment of the passage through the horizontal between the two roller center points and exhibits thereat always the same value. For this reason, the compressing force by means of which the material is compressed is dependent primarily from the quantity of the material drawn into the individual forms or molds.

In order to keep constant the filling degree of the forms with bulk or loose materials such as brown coal, bituminous coal, ores, and the like, it is known already to vibrate the material to be briquetted within the charging hopper or to supply the same to the roller gap by means of screw conveyors. (British Pat. 738,248; U.S. Pat. 1,408,550 and German Pat. 652,114).

As materials not capable of being briquetted on roller presses were considered heretofore those which have a high degree of fineness, for example, predominantly smaller than $40\mu$, and therefore exhibiting a very slight bulk density. To such materials belong, for example, sea water magnesia, which have a grain size smaller than $5\mu$ as well as fine dusts, flue-dusts, caustic magnesia, and raw cement dust for the manufacture of cement. Such materials have a bulk weight that amounts to 30% of the specific weight and less. Complicating the problems is added thereto the fact that the aforementioned materials do not behave as a normal bulk material but rather as a liquid. One can consider these materials as dispersion whereby the air functions as dispersing agent and the material occurs in dispersed phase. As a result thereof, the friction between the rollers and the mentioned materials is extraordinarily slight so that the rollers do not seize the material and are not able to draw it in as with normal loose or bulk material. Furthermore, by reason of the liquid-like properties, these materials escape through the smallest leakage places so that with a normal, conventional roller press, a very large material loss occurs and one has to accept prohibitive soiling within a short period of time.

It is the aim of the present invention to create an apparatus for briquetting on roller presses such bulk materials with a grain size predominantly smaller than $40\mu$, which behave like a liquid, as well as a roller press on which the briquetting can be carried out. In connection with the solution of this aim, it has been found surprisingly that such materials can be briquetted if they are precompressed or precondensed continuously at a predetermined ratio, which preferably lies between 1:1.5 and 1:2, to such an extent that the bulk density reaches about 50% of the specific weight. The exact ratio is thereby dependent on the grain size and on the grain composition. The fine material is converted by the accurately defined precompression into a behavior that corresponds far-reachingly to that of a normal bulk material.

The precompression can thereby take place by means of a feed screw conveyor which is constructed, however, correspondingly to the desired pre-compression ratio.

A roller briquette press with screw conveyor for materials with a grain size predominantly smaller than $40\mu$ is characterized according to the present invention in that the charging hopper abuts sealingly on all sides at its lower end against the outer surfaces and the end faces of the rollers and in that the screw conveyor is constructed for a precompression in the ratio of about 1:1.5 to 1:2.

With the use of a conical feed screw conveyor, the screw or spiral has to have surprisingly only a very small conicity in the ratio of inlet to discharge diameter of about 1:1.15 to 1:1.25.

With wide roller bands, a plurality of feed screw conveyors disposed adjacent one another within a common housing of corresponding conicity is provided according to the present invention whereby the screw conveyors are arranged with mutual overlap.

Accordingly, it is an object of the present invention to provide an apparatus for briquetting loose material on roller presses which avoids the aforementioned shortcomings and drawbacks encountered in the prior art.

Another object of the present invention resides in apparatus for briquetting bulk material with a grain size predominantly smaller than $40\mu$ which permits the use of roller presses.

Another object of the present invention resides in apparatus for briquetting bulk material having properties similar to liquid without a large loss in material and without a high degree of soiling.

These and further objects, features, and advantages of the present invention will become more obvious from the following description when taken in connection with the accompanying drawing which shows, for purposes of illustration only, two embodiments in accordance with the present invention, and wherein.

Figure 1:
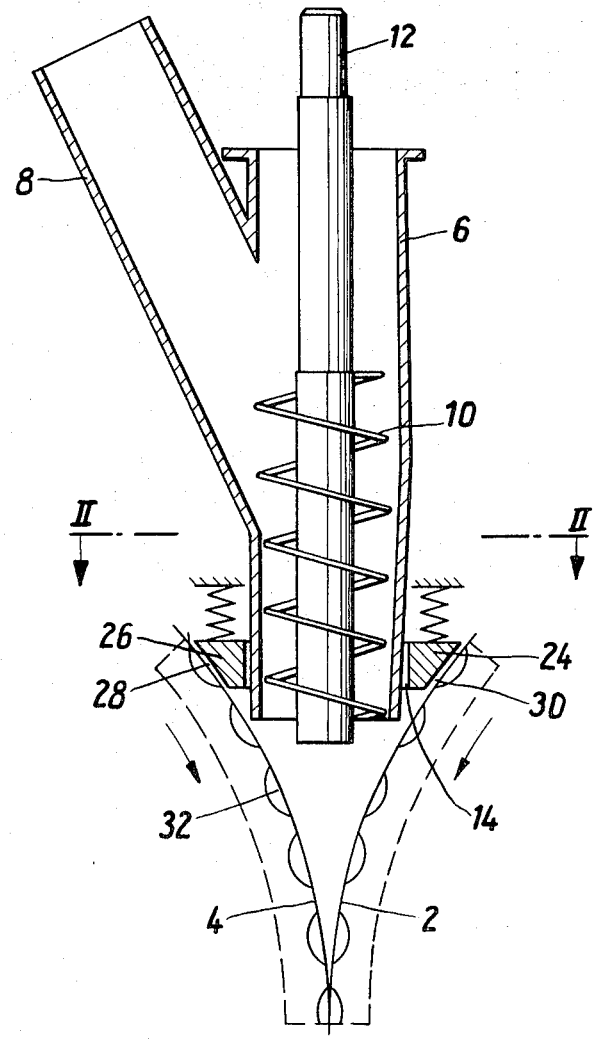
FIG. 1 is a cross-sectional view through a first embodiment of a briquetting roller press apparatus in accordance with the present invention equipped with a screw conveyor.
Figure 2:
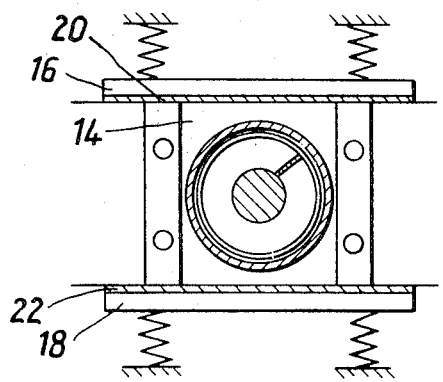
FIG. 2 is a cross-sectional view taken along line II—II of FIG. 1.

Referring now to the drawing, wherein like reference numerals are used throughout the various views to designate corresponding parts, and more particularly to FIG. 1, the roller press which is not illustrated in all of its details in this figure, comprises two rollers 2 and 4 provided at the outer circumference thereof with bands carrying forms or molds; the rollers 2 and 4 are driven in opposite directions. Roller presses of any known construction may be used for the roller presses of the present invention.

A charging hopper 6 engaging in the roller gap is provided which includes a charging extension 8; the materials to be briquetted are fed from a supply container or storage tank (not shown) from above to the extension 8. A screw conveyor or worm 10 is arranged in the feed hopper which is driven by way of the shaft end 12 in a conventional manner. The charging hopper 6 is constructed slightly conically below the inlet of extension 8, and more particularly with a conicity in the diameter ratio of about 1:1.15 to 1:1.25. The screw disposed in the charging hopper with slight lateral play is constructed at its lower end with a corresponding conicity.

The roller gap is sealed on all sides thereof at the lower end of the charging hopper. For that purpose a chamber is provided which includes a plate 14 connected with the charging hopper which serves as upper sealed closure. Lateral plates 16 and 18 are arranged abutting against the end faces of the rollers 2 and 4 or against the bands thereof and are provided on their sides facing the rollers with high wear-resistant covers or linings 20 and 22. These plates 16 and 18 abut simultaneously against the end faces of the plate 14 and are preferably pressed, preferably with spring pre-stress against the rollers and the plate 14.

Further sealing elements 24 and 26 are provided between the plate 14 and the circumference of the roller surfaces which are also provided on the sides facing the surface of the roller bands with high wear-resistant layers or linings 28 and 30. The width of the sealing elements 24 and 26 corresponds at least to the dimensions of the individual forms or molds 32 of the bands as measured in the circumferential direction of the roller bands. The sealing elements 24 and 26 are also under spring pre-stress; the plates 16 and 18 abut against their end faces.

In the manner described, the roller gap is completely sealed against the outside so that the material to be briquetted cannot escape out of the roller gap.

The material with a grain size predominantly smaller than 40μ fed through the inlet 8 is precompressed continuously by the conical part of the screw conveyor 10 in the ratio of 1:1.5 to 1:2. As a result of this relatively slight precompression, the air volume is reduced to about 50% of the entire volume or, in other words, the bulk density is increased up to about 50% of the specific weight.

As a result of this precompression, a filling degree is assured in the individual forms or molds that suffices to briquette the mentioned materials. It is understood that the reference to a material with a grain size predominantly smaller than 40μ is intended to refer to a material that may not readily have more than 25% of the grains larger than 40μ and, apart from impurities, does not include any grains larger than 100μ and exhibits liquid-like properties.

Figure 3:
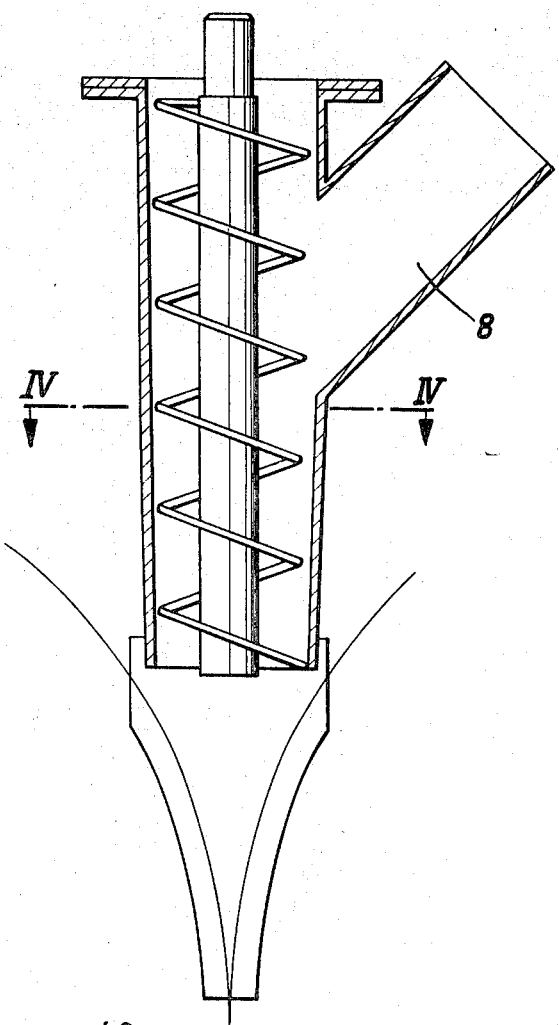
FIG. 3 is a cross-sectional view through a modified embodiment of an apparatus in accordance with the present invention equipped iwth several screw conveyors.
Figure 4:
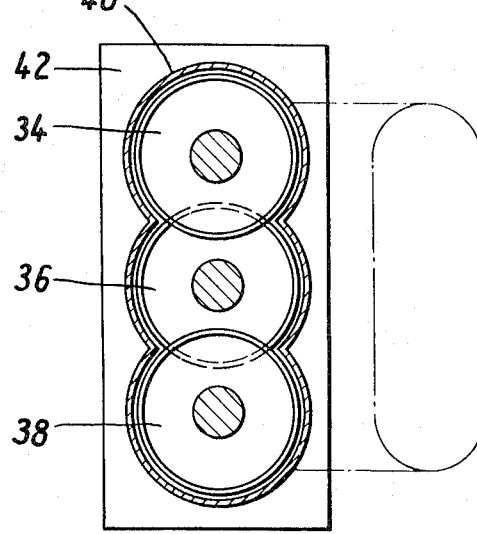
FIG. 4 is a cross-sectional view taken along line IV—IV of FIG. 3.

In the embodiment according to FIGS. 3 and 4, three feed screws 34, 36, 38 are provided adjacent one another which are so arranged that they mutually overlap with their spirals. The charging hopper housing 40 is thereby so constructed that it corresponds to the respective projection of the outer circumference of the overlapping worms or spirals. A plate 42 is again provided at the lower end of the screw conveyor housing 40 which covers the roller gap in the upward direction. The roller gap is sealed as to the rest by the plates 16 and 18 and by the sealing bars 24 and 26 in the manner described above.

The feed screws below the inlet 8 have again a conicity with a ratio of the inlet diameter to the discharge diameter of about 1:1.15 to 1:1.25. The housing 40 is also constructed within this area with a corresponding conicity. The screws may be constructed with the same direction of pitch whereby the drive for all screws then can take place in the same direction of rotation. However, the screws can also be constructed alternatively with opposite direction of pitch whereby the center screw 36 then would have to be driven opposite to the two outer screws 34 and 38.

While I have shown and described only two embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. A roller press with screw conveyor means for carrying out a briquetting method, comprising charging hopper means, roller means, said charging hopper means at its lower end abutting sealingly on all sides against the outer surfaces and end faces of the roller means, and said screw conveyor means being conical, the conicity of said screw conveyor means having a ratio of inlet to outlet diameter of about 1:1.15 to about 1:1.25 so as to be operable to provide a pre-compression in the ratio of about 1:1.5 to 1:2.

2. A roller press according to claim 1, further comprising common housing means, a plurality of screw conveyor means being arranged adjacent one another within said common housing means, and said screw conveyor means overlapping each other.

3. A roller press according to claim 1, further comprising means for sealing the roller gap which is formed between the lower end of the screw conveyor housing means and the contact line of the roller means, in the direction toward the end faces and the circumferences of the roller means.

4. A roller press according to claim 3, wherein said sealing means includes first cover plate means provided at the lower end of the screw conveyor housing means, and second cover plate means provided for covering the roller gap laterally, said second cover plate means frictionally abutting against the end faces of the roller means and of the first cover plate means.

5. A roller press according to claim 4, wherein said roller means are provided on the outside with band means, and wherein said sealing means includes sealing bar means provided between the first cover plate means and the circumference of the roller band means, said sealing bar means frictionally abutting against the circumference of the roller band means, and the width of the abutment surfaces of said bar means being at least equal to the length of forms provided in said band means as measured in the circumferential direction.

6. A roller press according to claim 3, wherein said roller means are provided on the outside with band means, and wherein said sealing means includes sealing bar means provided between the first cover plate means and the circumference of the roller band means, said sealing bar means frictionally abutting against the circumference of the roller band means, and the width of the abutment surfaces of said bar means being at least equal to the length of forms provided in said band means as measured in the circumferential direction.

7. A roller press according to claim 6, wherein the width of the abutment surfaces is greater than the length of the forms as measured in the circumferential direction.

8. A roller press according to claim 6, wherein the cover plate means and bar means are provided with a friction lining of high wear-resistant material.

9. A roller press according to claim 8, wherein said cover plate means and bar means are under spring-prestress.

References Cited

UNITED STATES PATENTS

| | | | |
|---|---|---|---|
| 1,347,361 | 7/1920 | Bibb | 25—77 |
| 1,405,788 | 2/1922 | Komarek | 25—77 |
| 1,879,293 | 9/1932 | Jones | 25—77 |
| 2,550,226 | 4/1951 | Colombo | 100—146 UX |
| 3,269,611 | 8/1966 | Komarek | 18—21 X |
| 3,470,815 | 10/1969 | Jung | 100—146 X |

FOREIGN PATENTS 27,524 of 1912 Great Britain _____ 25—75

PETER FELDMAN, Primary Examiner

U.S. Cl. X.R.

18—21; 25—77; 100—35, 155